United States Patent
Carcreff et al.

[11] Patent Number: 5,557,107
[45] Date of Patent: Sep. 17, 1996

[54] DEVICE FOR THE REAL TIME LOCATION OF RADIATION SOURCES

[75] Inventors: Hubert Carcreff, Cressely; Gilles Thellier, Evry, both of France

[73] Assignee: Commissariat A L'Energie Atomique, Paris, France

[21] Appl. No.: 402,958

[22] Filed: Mar. 13, 1995

[30] Foreign Application Priority Data

Mar. 21, 1994 [FR] France .................................. 94 03279

[51] Int. Cl.⁶ .................................................. G01T 1/29
[52] U.S. Cl. ........................ 250/361 R; 378/63; 378/150
[58] Field of Search ......................... 250/361 R; 378/63, 378/150

[56] References Cited

U.S. PATENT DOCUMENTS 3,107,276  10/1963  Cohen .
4,528,453  7/1985  Heller ................... 250/505.1
4,797,701  1/1989  Lannes ................. 250/475.2
5,204,533  4/1993  Simonet .............. 250/361 R
5,286,973  2/1994  Westrom et al. ....... 250/253

FOREIGN PATENT DOCUMENTS 0425333  10/1990  European Pat. Off. .

Primary Examiner—Carolyn E. Fields
Attorney, Agent, or Firm—Burns, Doane, Swecker & Mathis

[57] ABSTRACT

A device locating radiation sources includes a pinhole camera, a collimator means for closing off or obturating the camera, a luminescent or phosphor screen, and a camera optically coupled to the screen. The collimator comprises two half-collimators rotatable about a common rotation axis (AA').

16 Claims, 5 Drawing Sheets

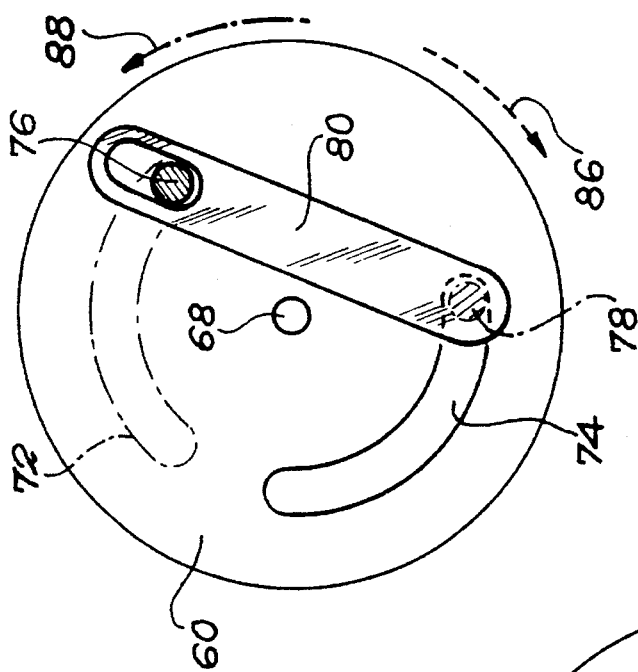
FIG. 5c
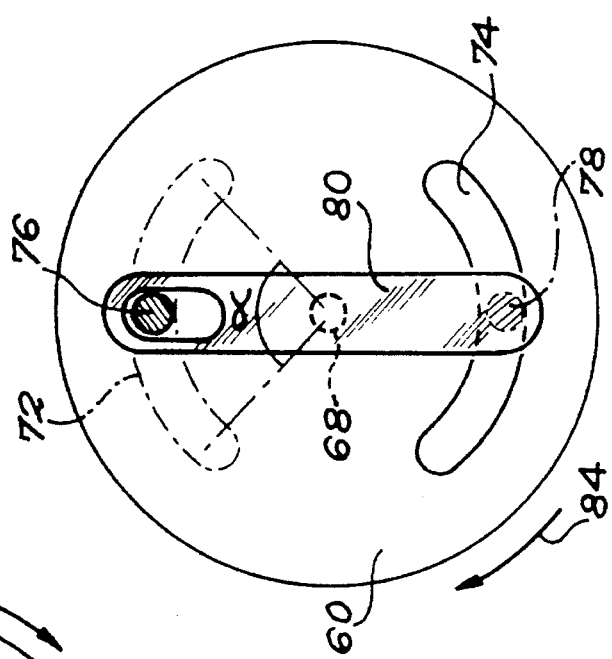
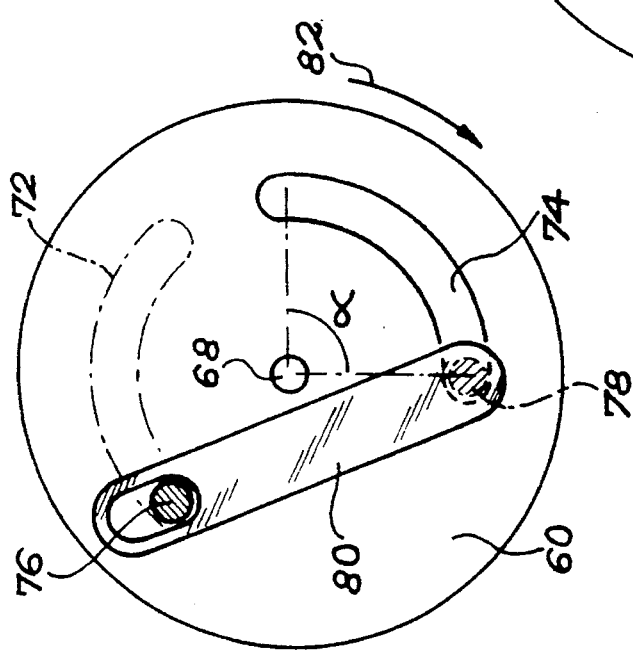
FIG. 5a
FIG. 5b

DEVICE FOR THE REAL TIME LOCATION OF RADIATION SOURCES

TECHNICAL FIELD AND PRIOR ART

The present invention relates to a collimator-shutter assembly, particularly for a gamma camera.

The invention more particularly applies to a device like that described in European patent application EP-A-425 333 filed in the name of the applicant (U.S. Pat. No. 5,204,533) and entitled "Device for the real time location of radiation sources". The device described in the above application is illustrated in FIG. 1.

This device is intended for the locating of radiation sources 2, particular gamma radiation sources, which may be located in a room. It has a pinhole camera 4 formed in a body 6 constituting a shield for the said camera 4 with respect to the gamma radiation. This body 6 can be made from a suitable tungsten-based alloy, such as the alloy known under the name Denal. It can comprise a detachable, peripheral portion 8 in which is inserted the remainder 10 of the body, which makes it possible to choose a peripheral shield 8 of varying thickness as a function of the level of activity of the surrounding sources 2. Means 12 symbolize an orientable support of the body 6 and therefore the device.

The remainder 10 of the body 6 comprises a collimator 14 facing the camera 4. The wall of the collimator 14 is constituted by two cones having the same aperture angle and opposed by their common apex, which is perforated in order to form the pinhole 16.

Level and around the pinhole 16, said collimator 14 can comprise a portion 18 opaque to the visible light coming from the examined area, but which is permeable to the gamma radiation, in order to take account of any inadequacy on the part of the activity of the gamma radiation sources 2 which it is wished to locate (double diaphragm pinhole).

Moreover, the collimator 14 can be interchangeable, which makes it possible to choose a single or double diaphragm collimator, having an aperture adapted to the assumed activity of the gamma sources 2 which it is wished to locate.

The device also has a mechanical obturator or shutter 20 for preventing the visible light from the area to penetrate the chamber 4, whilst permitting the passage of the gamma radiation. This shutter 20 is a photographic camera-type iris or, for example a metal plate perpendicular to the axis 22 of the body 6, located in the vicinity of the pinhole 16, on the side of the camera 4 and which is retractable. The movements of the plate forming the shutter 20 are remotely controlled by electromechanical means 24, which are themselves controlled by a remote control case 26, which can be located at a considerable distance from the device, if this proves necessary.

In the camera 4 and facing the pinhole 16, the device also has a luminescent or phosphor screen 28, which rests against an internal, circular shoulder of the body 6, level with the base of the conical wall of the collimator 14.

Behind the screen 28 is located a camera 30 connected to means 40 for the real time acquisition, processing and display of electrical signals and to the storage means 42.

When the shutter 20 is closed, at the end of a certain time (a few seconds, e.g. 10 s) the image of the gamma radiation sources is obtained. This image is stored in a first area of the memory of the means 40.

Then, by controlling the opening of the shutter 20, in quasi-instantaneous manner an image is obtained (in visible light) of the area observed and in which are located the sources 2. This second image is also stored in a second memory area of the means 40, which is separate from the first memory area.

The device shown in FIG. 1 can also comprise retractable means 44 for attenuating the gamma rays before they reach the screen 28. The means 44 are e.g. constituted by a tungsten screen or shield, whose thickness can be approximately 1 to 3 mm and which is perpendicular to the axis 22 of the device and is positioned in the vicinity of the pinhole 16 on the side of the cone of the collimator 14. The tungsten screen and the plate 20 can be mobile in an appropriate recess made in the body 6, or located at the inlet of the collimator.

Electromechanical means 46 are provided in the body 6 in order to control the retraction and putting into place of the screen 44. These means 46 are themselves controlled from the case 26 provided for this purpose.

The screen 44 makes it possible to evaluate the energy of the gamma photons by transmission, the intensity of the spot, relative to a gamma radiation source, on the image of the sources, being weaker when the tungsten screen 44 closes off the collimator 14 than when it is retracted and this applies the lower the energy of the radiation.

Although this device is satisfactory in certain respects, it still causes certain problems. Thus, the obturation system makes it possible to ensure the interchangeability of the collimator 14 (which permits the choice of a collimator having an aperture adapted to the assumed activity of the gamma sources 2 which it is wished to locate), as well as an all or nothing obturation in order to permit the passage from the visible to the gamma range. However, it does not make it possible to ensure a variation of the focal length of the collimator.

DESCRIPTION OF THE INVENTION

The invention proposes solving this problem. It aims at providing a device for locating sources with a collimator making it possible to ensure the three following functions:

an easy interchangeability of the collimator,
the possibility of passing from the visible observation range to the gamma observation range (obturation),
the variation of the focal length of the collimator.

Moreover, as a result of the conditions under which the observations are made, the obturation and focal length variation functions must be ensured in remote manner during observation.

The invention therefore relates to a device for the real time location of radiation sources, liable to be located in an area, said device comprising a pinhole camera, whose wall forms a shield with respect to the radiation of the sources, a collimator, means for obturating the pinhole camera, a phosphor screen, transparent in the luminous range and able to convert the radiation of the sources into a light radiation, the obturating means being on the one hand transparent to the radiation of the sources and on the other are able to prevent the light from the area reaching the screen, a camera which is optically coupled to the screen and able to supply, in the form of electrical signals, an image of the sources, as a result of the light radiation which it receives from the screen, and an image of the area, as a result of the light which it receives from said area through the screen when the obturating means are open, the sensitivity of the camera being adequate for it to obtain an acceptable image of the sources, for a given efficiency of the screen with respect to the detection of the radiation, the images being superimposable and visible due to the means for the processing and display of the electrical signals, characterized in that the collimator comprises two half-collimators rotatable about a common rotation axis, each half-collimator comprising:

a large and a small aperture, said apertures being centred on the common rotation axis, the small aperture being located in a planar surface (P, P') perpendicular to said axis, a circular arc spotfacing of angle α centred on the common rotation axis and issuing into the surface containing the small aperture, a pin which can be incorporated into the circular arc spotfacing of the other half collimator, and in that the obturating means are in the form of a lamella located between the two planar surfaces and extending from one pin to the other, each pin passing through a hole in the lamella, the latter having an adequate width to be able to entirely obturate the two small apertures.

Such a system ensures two functions, because:

during the rotating of one of the two half-collimators about the common rotation axis, the shutter is firstly rotated about the pin or peg fixed to the other half collimator in order to be brought into the cutting off or obturating position in front of the two small apertures, when the pin of the rotating half-collimator abuts against one end of the circular arc spotfacing of the fixed half-collimator, the latter is made to move with the initially rotated half-collimator.

It is therefore easily possible to combine this movement, which is a common rotary movement, with a translatory movement.

Thus, one of the half-collimators can have a cylindrical outer surface, whose axis of symmetry coincides with the common rotation axis of the two half-collimators and which is threaded on its outer portion, said threaded portion engaging in a thread made in the wall of the pinhole camera. In this way, when the second half collimator is rotated, its movement is transformed into a translatory movement.

The rotation of the first half-collimator can e.g. be ensured by the fact that said first half-collimator is integral with a cylindrical, notched, outer ring.

Thus, the two functions of obturating and varying the focal length can be remotely ensured during inspection.

In addition, a single control can ensure these two functions, because one of the functions (obturation) is ensured first and the other second.

The objective or lens can be rotated by a motor located outside the pinhole camera and means are provided for transmitting the movement of the motor to the lens.

The detection means can incorporate a phosphor screen, a camera optically coupled to the screen and means for processing and displaying signals from the camera.

The camera can be placed inside or outside the pinhole camera. In the latter case it is coupled to the phosphor screen by an optical fibre bundle.

Finally, the assembly can be inserted in a mechanical protection envelope.

DESCRIPTION OF THE DRAWINGS

The invention is described in greater detail hereinafter relative to non-limitative embodiments and with reference to the attached drawings, wherein show:

FIGS. 5a to 5c Different portions of the obturating lamella incorporated into the collimator used in the locating device according to the invention.

DETAILED DESCRIPTION OF EMBODIMENTS

Figure 2:
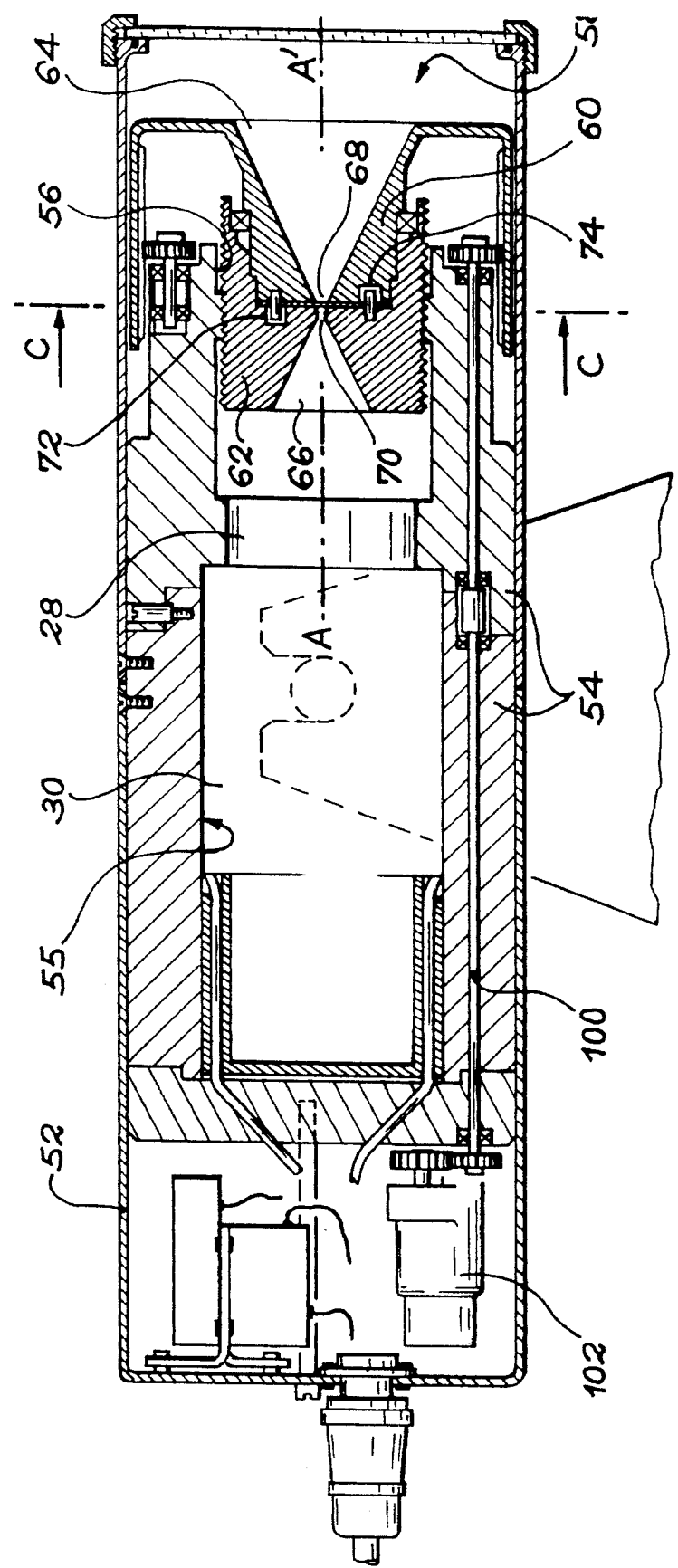
FIG. 2 A general sectional view of a device according to the invention.

FIG. 2 is a sectional view of a source locating device according to the invention. It is possible to see an outer body 52 or envelope for providing a mechanical and radiological protection for the complete camera.

This mechanical protection contains a second envelope or protective wall 54 which serves, when the camera is inserted in an environment where gamma rays are emitted, to protect electronic or optoelectronic components which might be sensitive to said rays. The envelope or wall 54 defines a pinhole camera 55 and has a front opening 56 for receiving the lens 58 (FIG. 2).

Figure 3:
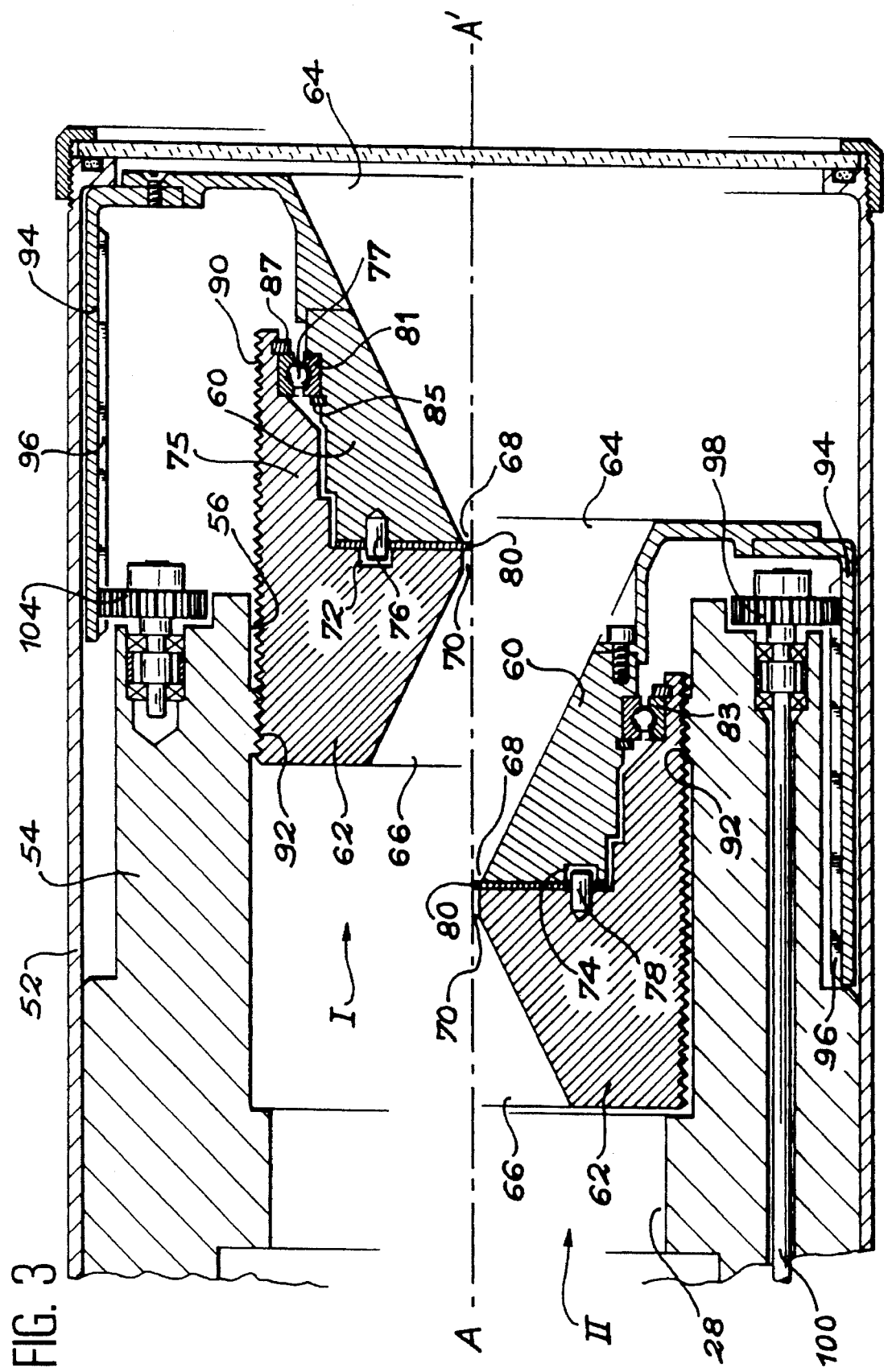
FIG. 3 A profile view in section of the collimator used in the locating device according to the invention in two different positions.
Figure 4:
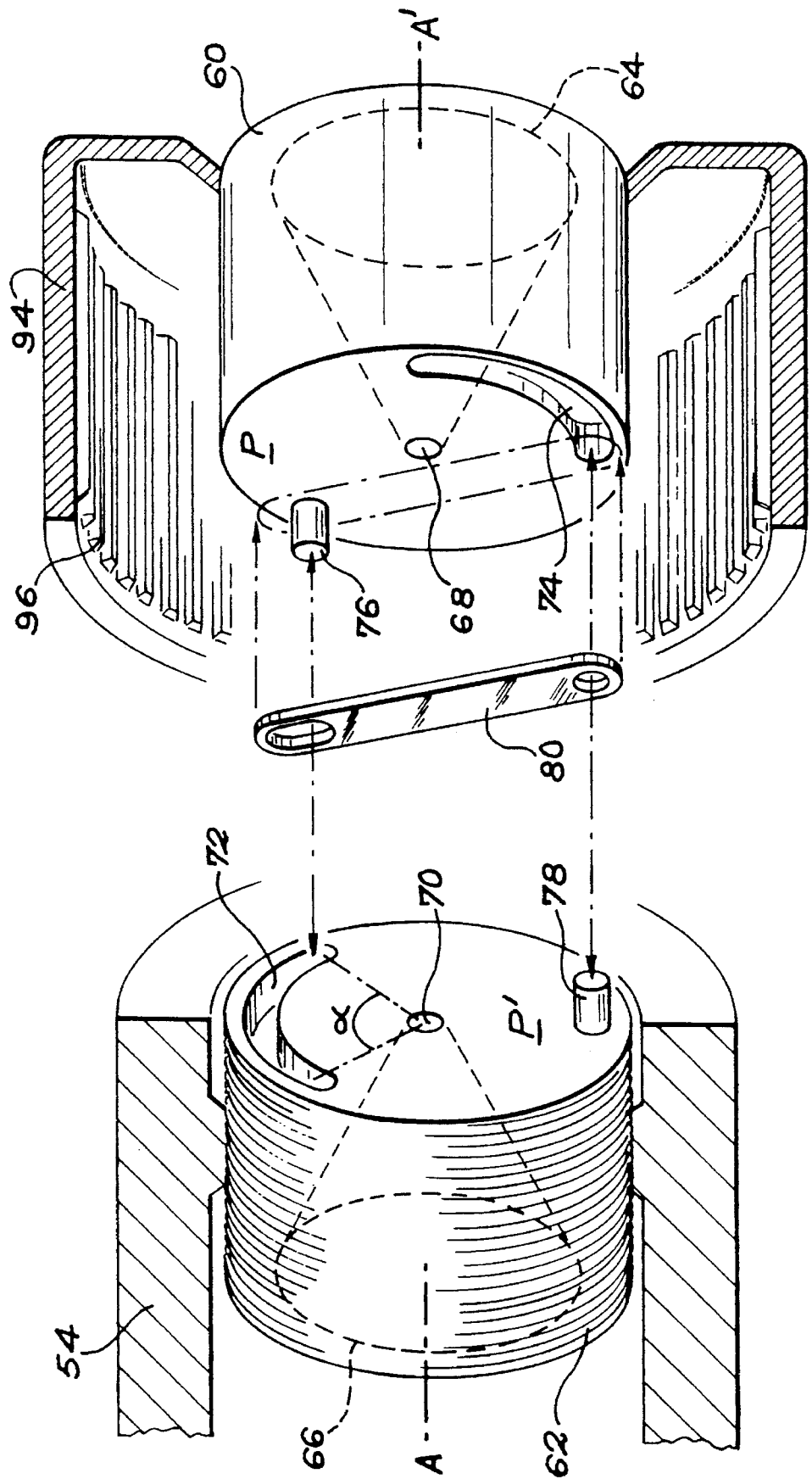
FIG. 4 A perspective view of the two half-collimators and the lamella constituting the collimator.

This collimator, which is also shown in greater detail in FIGS. 3 and 4, comprises two portions 60, 62, each of which has a large 64, 66 and a small 68, 70 aperture. The two portions are rotatable about a common axis AA'. Hereinafter the portion 60 will be called the front half-collimator and the portion 62 the rear half-collimator.

The large and small apertures of each half-collimator are inscribed on a cone of revolution, whose axis of symmetry coincides with the common rotation axis of the two half-collimators. The apex angle of the cone can e.g. be between 25° and 90° and the lower the radiation energy emitted by the sources to be located the larger said angle.

Thus, two sets of half-collimators are obtained, one having an apex angle of 38° and the other an apex angle of 52°.

The small and large apertures of each half-collimator are consequently centred on the common rotation axis AA' and each aperture is contained in a planar surface perpendicular to the axis AA'. For the small aperture, said planar surface is designated by P and P' in FIG. 4 for the half-collimators.

In each half-collimator and issuing into the plane P,P' corresponding thereto is provided a circular arc spotfacing 72, 74 of angle α, centred on the common rotation axis AA' of the two half-collimators. Preferably the angle α is 90°.

The spotfacings 72, 74 are clearly visible in FIGS. 5a to 5c, which constitute a section along CC in FIG. 2, as well as FIG. 4. In addition, each of the half-collimators of the lens comprises a pin or peg 76, 78 for incorporating into the circular arc spotfacing of the other half-collimator. These pins also traverse two holes located at the end of a lamella 80, positioned between the two planar surfaces P, P' and which fulfils the function of a shutter, when it passes between the two small apertures 70, 68.

FIG. 5a will be used for explaining the operation of the collimator and in it the two pins 76, 78 are in abutment in the circular arc spotfacings 72, 74.

When a rotation about the common rotation axis AA', symbolized by the arrow 82 in FIG. 5a, is imparted to the front half-collimator 60, the circular arc spotfacing 74 and the pin 76, both of which form part of the front half-collimator 60, are also rotated about the same axis AA'.

Thus, the upper end of the lamella 80 also rotates, but around the pin 78, which remains fixed because it is integral with the rear half-collimator 62. The hole of the lamella 80, traversed by the pin 76, has an oblong shape, so that the rotation of the lamella 80 can be correctly ensured. At midtravel, the lamella 80 is consequently in the vertical position, as illustrated in FIG. 5b and closes off the small apertures 68 and 70.

If the camera is a gamma camera, the visible rays emitted by the external radiation sources are stopped by said lamella 80, in their propagation in the direction of detection elements located within the body 54. However, the gamma rays could traverse the lamella 80 and then, with the aid of means to be described hereinafter, an image could be formed of the distribution of the sources emitting said gamma rays in the direction of the camera.

If rotation is continued in the same direction (arrow 84 in FIG. 5b), the circular arc spotfacing 74 and the pin 76 continue their respective travel. At the end of travel, the position of the lamella illustrated in FIG. 5c is arrived at, i.e. the small apertures 68 and 70 are freed. Therefore, once again an observation in the visible range is possible.

It must be stressed that during the rotation of the front half-collimator 60, as illustrated in FIGS. 5a to 5c, the rear half-collimator 62 is never rotated. The front half-collimator is also guided in its rotation by a ballbearing 77, whose inner race 81 and outer race 83 respectively bear on the outer surface of the front half-collimator 60 and the inner surface of a ring 75, which extends the rear half-collimator 62 towards the front in such a way as to surround the front half-collimator 60.

It is only when the rotary movement of the front half-collimator 60 continues as from the position of FIG. 5c (broken line arrow 86) that said rear half-collimator 62 is also rotated, as a result of the abutment position of the pin 76 at the end of the circular arc spotfacing 72. The lamella 80 then remains in the same position with respect to the two half-collimators 60, 62 and the three elements 60, 72, 62 undergo the same rotary movement.

If, however, the movement of the front half-collimator is reversed from the position of FIG. 5c (arrow 88), the lamella 80 and the front half-collimator 60 are returned to the position of FIG. 5b, the rear half-collimator 62 still remaining stationary.

Thus, this system successively fulfils two functions:

firstly the obturation and then non-obturation of the small apertures 70 and 68 whilst not modifying the position of the rear half-collimator 62 and with no variation of the focal length, secondly the rotation of the two half-collimators, the lamella 80 being in a position in which it does not close off the apertures 70 and 68, so that the observer sees in the visible range. It is possible to provide a mechanism or means for combining the rotary movement of the rear half-collimator with a translatory movement. Thus, if said half-collimator 62 has a cylindrical outer surface 90 (cf. FIGS. 3 and 4) and if said outer surface is threaded, said half-collimator 62 can be engaged in a thread 92 formed in the body of the protective envelope 54. Thus, the rotation of the rear half-collimator 62 automatically brings about its displacement, e.g. towards the rear of the camera, and makes it pass from the front position I, illustrated in FIG. 3, to the rear position II therein. Thus, the thread 90 must be provided over an adequate length for the displacement of the collimator to be ensured between the two extreme positions. It can extend over the entire outer surface of the front portion 75 of the rear half collimator.

Segments 85, 87 respectively fixed to the front half-collimator 60 and the rear half-collimator 62 make it possible, in combination with the ballbearing races 81, 83, to drive the front half-collimator following the rear half-collimator, in particular in a displacement towards the rear of the apparatus (direction I→II in FIG. 3).

In the apparatus constructed by the applicant, the variation between the two extreme positions is 50 mm.

A ring-shaped part 94 integral with the front half-collimator 60 and outside the latter makes it possible to rotate said half-collimator 60. As illustrated in FIGS. 3 and 4, the ring has a notched inner surface 96 on which is engaged a pinion 98, which transmits, via a shaft 100, the rotary movement of a motor 102 (FIG. 2). In order to ensure the centring and a better guidance of the ring, the latter can bear on other pinions integral with the envelope 54, particularly in the exit position (e.g. reference 104 in FIG. 3).

The speed and rotation direction of the motor 100 can be controlled from the outside of the case 52 by a not shown device. For a maximum focal length of 50 mm, a motor driving the assembly at a speed of 1 mm/s permits the traversing of the entire travel in 50 seconds.

Thus, a single control system makes it possible to control two functions of the lens, on the one hand the passage from the visible observation range to the gamma observation range (obturation) and on the other hand the variation of the focal length of the lens.

During any focal length manipulation towards the front or rear, the lamella 80 does not obturate the aperture 70 and 68 and the user can observe what occurs in the field of the camera invisible light. At any time, e.g. when the focal length is appropriately adjusted, he can interrupt the variation of the focal length and pass to gamma observation. For this purpose it is merely necessary to reverse the rotation direction of the front half-collimator 60 and make it undergo a rotation of angle α/2, which returns the lamella 80 to the position of obturating the apertures 70 and 68.

This system also makes it possible to ensure a perfect correspondence between the fields observed in the visible and gamma ranges. Thus, during the passage from the position where the apertures 60 and 78 are obturated by the lamella 80 (FIG. 5b) to the non-obturation position (FIGS. 5a or 5c), the front half-collimator 60 does not rotate the rear half-collimator 62 and consequently there is no change to the focal length.

Thus, as from a position of non-obturation (observation in the visible range), only the rotation direction of the motor makes it possible to choose between the two obturation and focal length variation functions.

Figure 1:
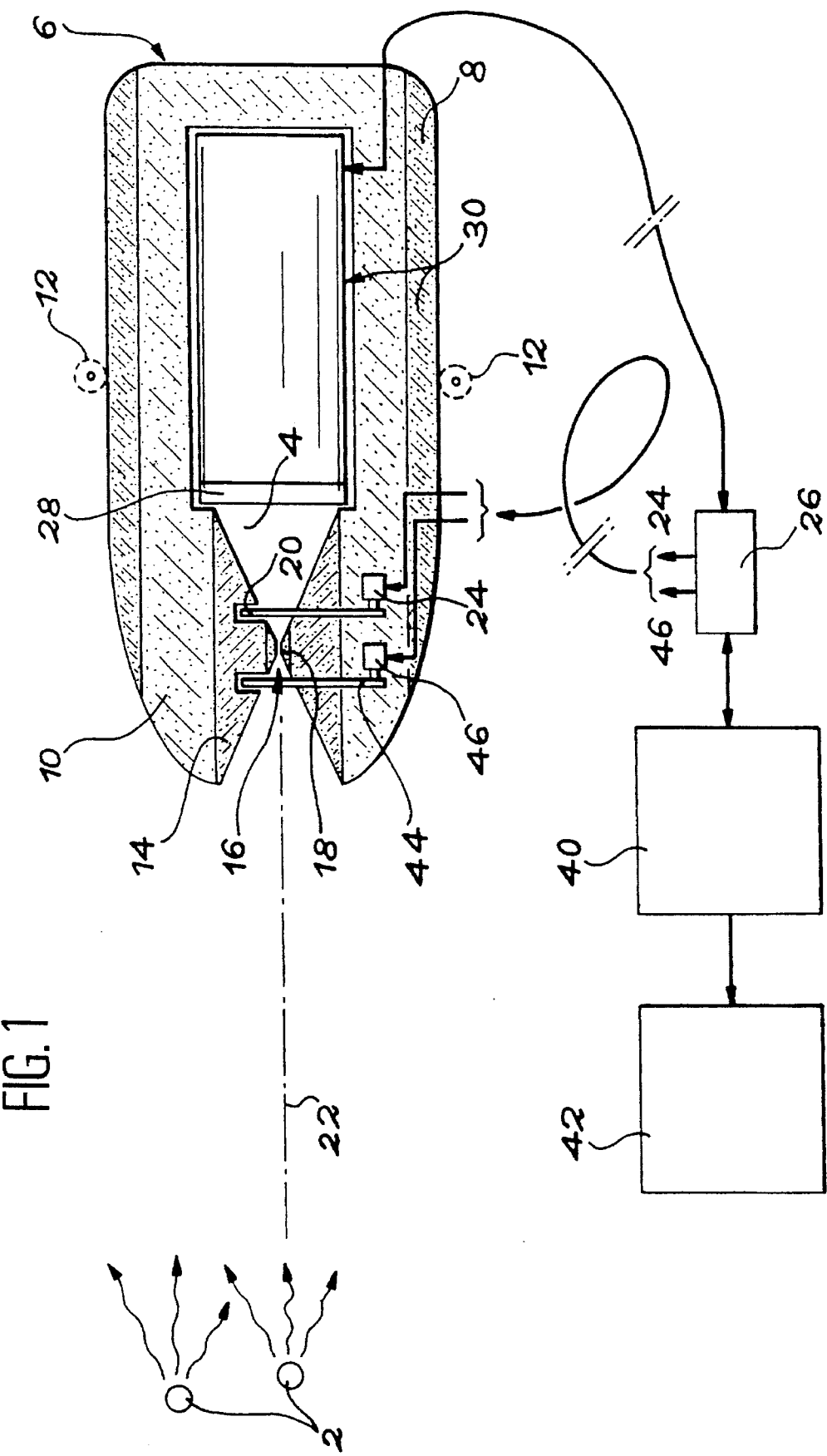
FIG. 1 Already described, a device for locating radiation sources according to the prior art.

Different means permitting the observation of the radiation from the sources 2 must be provided. These means can be those described in U.S. Pat. No. 5,204,533, granted on Apr. 20, 1993 and whose content is incorporated by reference into the present description and which are dealt with hereinbefore in conjunction with FIG. 1:

a phosphor screen 28, located behind the above-described lens and referred to in conjunction with FIGS. 2 and 3, a camera 30 optically coupled to the screen 28 and referred to in conjunction with FIG. 2, means 40 for the real time acquisition, processing and display of the electrical signals supplied by the camera, storage means 42.

Thus, the screen 28 can on the one hand be transparent in the visible range and on the other can convert the gamma radiation of the sources 2 into a radiation detectable by the camera 30.

The material chosen for the screen will preferably be a dense material having a good light output ratio. The screen is preferably thin (a few mm thick) so that there is a good spatial resolution.

Preferably, the camera 30 is very sensitive in order to permit the use of a thin screen, made from a scintillating material transparent in the visible range and having a good gamma radiation detection sensitivity. It is also preferable for the camera 30 to have a good resistance to gamma conditions and a good reliability.

For example, the entrance window of the camera 30 is engaged against the screen 28, which is consequently positioned between the lens and the camera 30.

Thus, the camera can be located outside and remote from the body 54. A bundle of optical fibres able to conduct the visible radiation emitted by the screen and the visible light from the observed area, then connects the screen 28 to the camera 30, whilst traversing the body 54. One end of the fibre bundle normally leads to the screen and covers the surface of the latter. The other end of the bundle normally leads to the camera entrance window and covers the same.

The mechanism for varying the focal length of the camera has been explained hereinbefore.

During use, when the shutter 80 is closed, at the end of a certain time (a few seconds, e.g. 10 s) the image of the gamma radiation sources is obtained and is stored in a first memory area of the means 40. Then, by controlling the opening of the shutter 80, in quasi-instantaneous manner an image (invisible light) is obtained of the observed area in which the sources 2 are located. This second image is also stored in a second memory area of the means 40 and which is separate from the first memory area.

After processing the images (within particular a possibility of colouring "spots"), the correct positioning of the sources takes place by superimposing the gamma radiation image on the image in the visible range due to the activity of the sources 2 in order to appropriately position the sources and distinguish their "gamma brightness" from the brightness (in visible light) of objects present in the observed area, but which emit no gamma radiation, the first and second images being displayed in superimposed manner on the screen of the means 40, which permits the positioning of the gamma radiation sources.

In order to carry out activity measurements of the sources 2, the camera is used in combination with a laser telemeter in accordance with the method described in U.S. Pat. No. 5,204,333.

It is pointed out that the apparatus described hereinbefore not only makes it possible to fulfil the two functions of varying the focal length and passing from the visible observation field to the gamma observation field, but also permits a rapid disassembly of the lens, because it is merely necessary to unscrew it and replace it e.g. by a lens having a different aperture.

I claim:

1. Device for the real time location of radiation sources, liable to be located in an area, said device comprising a pinhole camera, whose wall forms a shield with respect to the radiation of the sources, a collimator, means for obturating the pinhole camera, a phosphor screen, transparent in the luminous range and able to convert the radiation of the sources into a light radiation, the obturating means being on the one hand transparent to the radiation of the sources and on the other are able to prevent the light from the area reaching the screen, a camera which is optically coupled to the screen and able to supply, in the form of electrical signals, an image of the sources, as a result of the light radiation which it receives from the screen, and an image of the area, as a result of the light which it receives from the said area through the screen when the obturating means are open, the sensitivity of the camera being adequate for it to obtain an acceptable image of the sources, for a given efficiency of the screen with respect to the detection of the radiation, the images being superimposable and visible due to the means for the processing and display of the electrical signals, characterized in that the collimator comprises two half-collimators rotatable about a common rotation (AA') axis, each half-collimator comprising:

a first aperture having a maximum size (or width) D1, a second aperture having a maximum size (or width) D2, with D2<D1, said apertures being centered on the common rotation axis, the second aperture being located in a planar surface (P, P') perpendicular to said axis, a circular arc spotfacing of angle α centered on the common rotation axis (AA') and issuing into the surface containing the second aperture, a pin which can be incorporated into the circular arc spotfacing of the other half collimator, and in that the obturating means are in the form of a lamella located between the two planar surfaces and extending from one pin to the other, each pin passing through a hole in the lamella, the latter having an adequate width to be able to entirely obturate the two second apertures.

2. Device according to claim 1, the first and second aperture of each half-collimator being inscribed on a cone of revolution, whose axis of symmetry coincides with the common rotation axis of the two half-collimators.

3. Device according to claim 2, the apex angle of the cone being between 25° and 90°.

4. Device according to claim 1, the angle α being 90°.

5. Device according to claim 1, one of the holes in the lamella being oblong.

6. Device according to claim 1, also having means for combining the rotary movement of the half-collimators with a translatory movement.

7. Device according to claim 6, one of the two half-collimators having an outer cylindrical surface, whose axis of symmetry coincides with the rotary axis of the two half-collimators and which is threaded on its outer portion, which engages in a thread made in the wall.

8. Device according to claim 7, the other half-collimator being integral with an outer, cylindrical, notched ring.

9. Device according to claim 8, the collimator being rotated by a motor located outside the pinhole camera, means being provided for transmitting the movement of the motor to the collimator.

10. Device according to claim 8, the camera being placed in the pinhole camera.

11. Device according to claim 8, the camera being placed outside the pinhole camera and being coupled to the screen by a bundle of optical fibres, the ends of the fibres being located in the pinhole camera.

12. Device according to claim 8, also comprising a mechanical protection envelope.

13. Device according to claim 1, the collimator being rotated by a motor located outside the pinhole camera, means being provided for transmitting the movement of the motor to the collimator.

14. Device according to claim 1, the camera being placed in the pinhole camera.

15. Device according to claim 1, the camera being placed outside the pinhole camera and being coupled to the screen by a bundle of optical fibres, the ends of the fibres being located in the pinhole camera.

16. Device according to claim 1, also comprising a mechanical protection envelope.

* * * * *